United States Patent
Ray et al.

(10) Patent No.: US 6,463,514 B1
(45) Date of Patent: Oct. 8, 2002

(54) METHOD TO ARBITRATE FOR A CACHE BLOCK

(75) Inventors: David Scott Ray, Georgetown; Shih-Hsiung Stephen Tung; Pei Chun Liu, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 09/025,605

(22) Filed: Feb. 18, 1998

(51) Int. Cl.⁷ .............................................. G06F 12/00
(52) U.S. Cl. ...................... 711/168; 711/210; 711/220
(58) Field of Search ................................. 711/168, 210, 711/220

(56) References Cited

U.S. PATENT DOCUMENTS

| | | | | |
|---|---|---|---|---|
| 4,547,849 A | * | 10/1985 | Louie et al. ................... 710/3 |
| 5,420,809 A | * | 5/1995 | Read et al. ................. 708/200 |
| 5,664,168 A | * | 9/1997 | Yishay et al. ................ 713/600 |
| 5,737,569 A | * | 4/1998 | Nadir et al. ................. 711/149 |

* cited by examiner

Primary Examiner—Matthew Kim
Assistant Examiner—M. D. Anderson
(74) Attorney, Agent, or Firm—Robert M. Carwell; Bracewell & Patterson, L.L.P.

(57) ABSTRACT

A method of arbitrating between cache access circuits (i.e., load/store units) by stalling a first cache access circuit in response to detection of a conflict between a first cache address and a second cache address. The stalling is performed in response to a comparison of one or more subarray selection bits in each of the first and second cache addresses, and further preferably includes a common contention logic unit for both the first and second cache access circuits. The first cache address is retained within the first cache access circuit so that the first cache access circuit does not need to re-generate the first cache address. If the same word (or doubleword) is being accessed by multiple load operations, this condition is not considered contention and both operations are allowed to proceed, even though they are in the same subarray of the interleaved cache.

17 Claims, 4 Drawing Sheets

METHOD TO ARBITRATE FOR A CACHE BLOCK

BACKGROUND OF THE INVENTION

1. Field of the Invention

The present invention generally relates to computer systems, and more particularly to a method and device for arbitrating cache operations in a multi-port cache of a processing unit, i.e., a cache memory that is capable of being accessed by multiple input addresses within a single processor cycle.

2. Description of Related Art

The basic structure of a conventional computer system includes one or more processing units connected to various input/output devices (such as a display monitor, keyboard, and permanent storage device), and a system memory device (such as random access memory or RAM) that is used by the processing units to carry out program instructions. The processing units communicate with the other devices by various means, including one or more generalized interconnects. A computer system may have many additional components such as serial and parallel ports for connection to, e.g., modems or printers, and other components that might be used in conjunction with the foregoing; for example, a display adapter might be used to control a video display monitor, a memory controller can be used to access the system memory, etc.

A typical processing unit includes various execution units and registers, as well as branch and dispatch units which forward instructions to the appropriate execution units. Caches are commonly provided for both instructions and data that are loaded into these logic units and registers, to temporarily store values that might be repeatedly accessed by a processor. The use of a cache thus speeds up processing by avoiding the longer step of loading the values from the system memory (RAM) or from some other distant component of the memory hierarchy. These caches are referred to as "on-board" when they are integrally packaged with the processor core on a single integrated chip. Each cache is associated with a cache controller or bus interface unit that manages the transfer of values between the processor core and the cache memory.

A processing unit can include additional caches, such as a level 2 (L2) cache which supports the on-board (level 1) caches. In other words, the L2 cache acts as an intermediary between system memory and the on-board caches, and can store a much larger amount of information (both instructions and data) than the on-board caches can, but at a longer access penalty. Multi-level cache hierarchies can be provided where there are many levels of interconnected caches, as well as caches that are grouped in clusters to support a subset of processors in a multi-processor computer.

A cache has many blocks which individually store the various instruction and data values. The blocks in any cache are divided into groups of blocks called "sets" or "congruence classes." A set is the collection of cache blocks that a given memory block can reside in. For any given memory block, there is a unique set in the cache that the block can be mapped into, according to preset mapping functions. The number of blocks in a set is referred to as the associativity of the cache, e.g., 2-way set associative means that for any given memory block there are two blocks in the cache that the memory block can be mapped into; however, several different blocks in main memory can be mapped to any given set.

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicating the validity of the value stored in the cache). The address tag is a subset of the full address of the corresponding memory block. A compare match of an incoming address with one of the tags within the address tag field indicates a cache "hit." The collection of all of the address tags in a cache is referred to as a directory (and sometimes includes the state bit and inclusivity bit fields), and the collection of all of the value fields is the cache entry array.

For a high-speed processor device such as a superscalar, reduced instruction set computing (RISC) processor wherein more than one instruction can be executed during a single processor cycle, demands for simultaneous multiple accesses to the cache memory are increasing. The processor device may have to access more than one effective address and/or real address of the cache memory in a single processor cycle, in order to take full advantage of the RISC performance. Hence, a cache memory is often partitioned into multiple subarrays (interleaved) in order to achieve single-cycle, multi-port access. An interleaved cache memory has the potential of being accessed by more than one address and producing more than one output value in a single processor cycle.

Although various arrangements of subarrays allow simultaneous multiple accesses to the cache memory, each of these accesses must still be in a separate subarray of the cache memory, because only one cache line within a single subarray can be driven by the wordline driver circuit at a given time. Thus, if more than one access to the cache lines in a single subarray is attempted, arbitration logic of the cache memory must be used to select one of the accesses to proceed before the rest. Prior art caches, however, can require an excessive amount of time to arbitrate between the blocks, due to the manner in which a conflict (contention) is handled. Partial addresses are analyzed when sent to a cache, and compared to determine if they are accessing the same block. This approach requires added cycles after generation of the effective address.

Conventional conflict detection/resolution is depicted in FIG. 1. A load/store unit 1, associated with a processor, generates a store cache address which is forwarded to a queue 2. In the depicted embodiment, queue 2 holds up to eleven store operations which have been generated by load/store unit 1. At some point in time, one or more operations will be pending in queue 2, and load/store unit 1 will execute new load operations, generating another cache address. It is possible that the new operation from load/store unit 1 can be executed at the same time that the next store operation in queue 2 is executed, since the cache 3 is interleaved, having a first block 4 and a second block 5. Simultaneous execution of the operations can only occur, however, if the two operations are directed to values which are stored in the two different blocks (subarrays) 4 and 5. Conflict detection logic 6 (in the data unit control) evaluates the subarray selection bit(s) within the effective addresses to determine if a conflict exists. Conflict detection logic 6 is part of the cache control logic (hit/miss logic).

For example, in a 2-subarray PowerPC™ cache, bit 56 of the effective address field is evaluated. Conflict detection logic 6 is connected to the same buses that connect load/store unit 1 and queue 2 to each of the subarrays 4 and 5 of cache 3. If a conflict does exist, the data unit control stalls the load access (from load/store unit 1), by forcing a "retry"

at a data unit load miss queue 7, and allows the other access (from queue 2) to proceed. The delayed operation is re-issued at the next available time slot, which is at least three cycles after the original access attempt. DU load miss queue 7 is similar to a typical miss queue in front of a cache, that keeps addresses (real and effective) of load accesses which missed the cache. When the miss is "resolved," the address is transmitted back through the cache, a hit occurs, and the data are forwarded to their respective destinations. "Resolving" the miss can mean the typical case, as in a miss in the cache, wherein data is reloaded from the L2 cache or beyond, allocated to the cache, and then the operation is retried from miss queue 7. Alternatively, in the case of a conflict, the effective address is placed in the miss queue, and a retry occurs when possible. Arbitration into a multiplexer (not shown) above each of the cache blocks 4 and 5 is completed in one cycle; the address is driven into the cache during the next cycle using a latch (also not shown), and data are returned the following cycle.

Another drawback with conventional contention logic relates to simultaneous access (loads only) of a single cache address. Such simultaneous access is detected as a conflict, requiring arbitration, but this condition should not be considered contention since accesses of the same word or double word in the form of load operations can be satisfied by forwarding the value to multiple units at the same time.

In light of the foregoing, it would be desirable to devise an improved method for resolving address contention in a multi-port cache, which decreases delays associated with conflict detection. It would be further advantageous if the conflict resolution circuits could detect that the same word was being accessed by the different cache address, and so non-contending, and forward the word to those ports such that simultaneous multiple-access capability can be greatly enhanced.

SUMMARY OF THE INVENTION

It is therefore one object of the present invention to provide an improved cache memory for a high-speed data processing system.

It is another object of the present invention to provide such an improved cache memory which allows multiple accesses in a single processor cycle.

It is yet another object of the present invention to provide an improved cache memory which more efficiently handles actual and apparent address conflicts.

The foregoing objects are achieved in a processing unit, generally comprising a first cache access circuit generating a first cache address, a second cache access circuit generating a second cache address, an interleaved cache connected to said first and second cache access circuits, and means for stalling the first cache access circuit in response to detection of a conflict between the first cache address and the second cache address. The stalling means includes means for detecting contention based on one or more subarray selection bits in each of said first and second cache addresses, and further preferably includes a common contention logic unit for both the first and second cache access circuits. The stalling means retains the first cache address within the first cache access circuit so that the first cache access circuit does not need to re-generate the first cache address.

The present invention further conveniently provides means for determining that the same word or double word is being accessed by both cache access units. This condition is not considered contention since the doubleword being accessed can be forwarded to both units at the same time, so both operations are allowed to proceed, even though they are in the same subarray of the interleaved cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
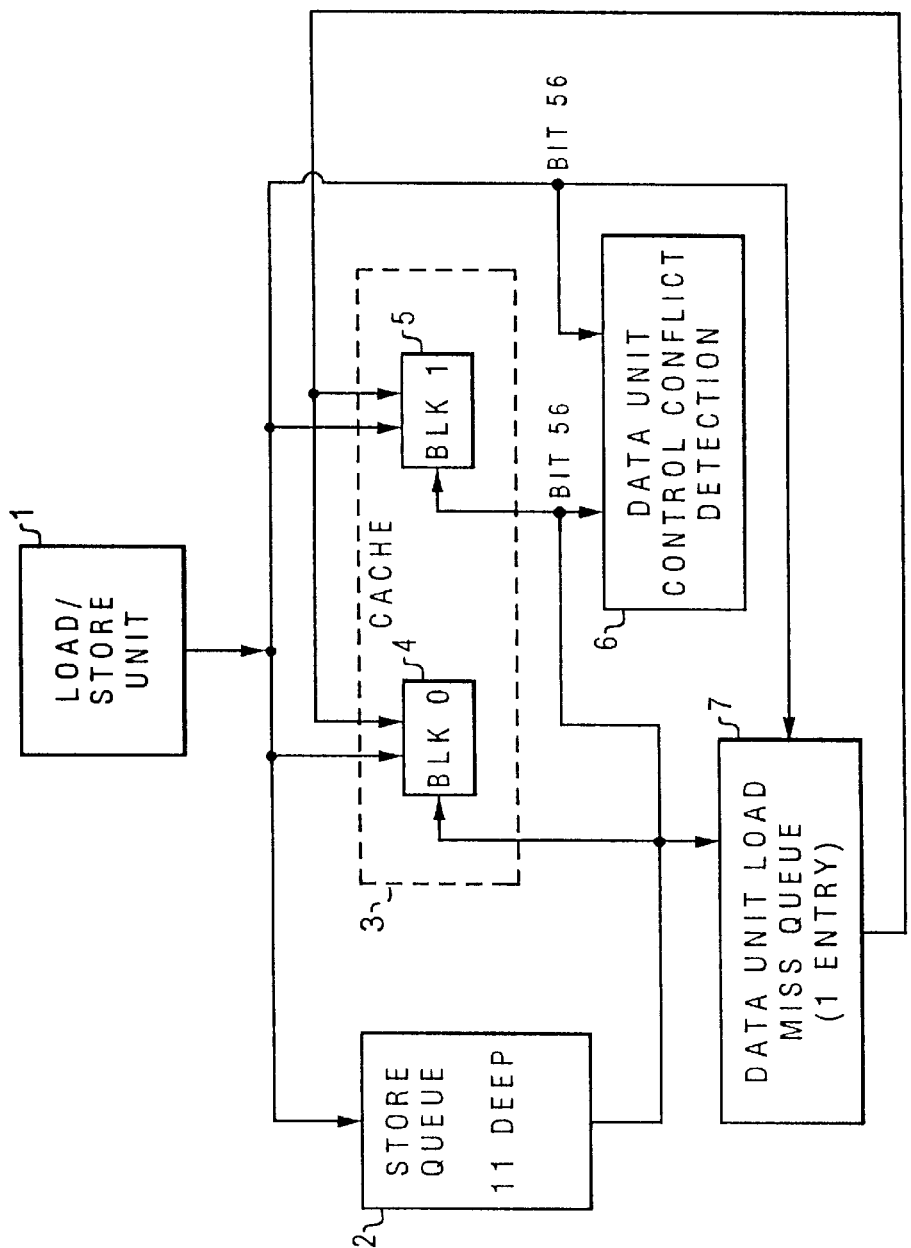
FIG. 1 is a block diagram of a prior art conflict resolution method for a multi-port cache.
Figure 2:
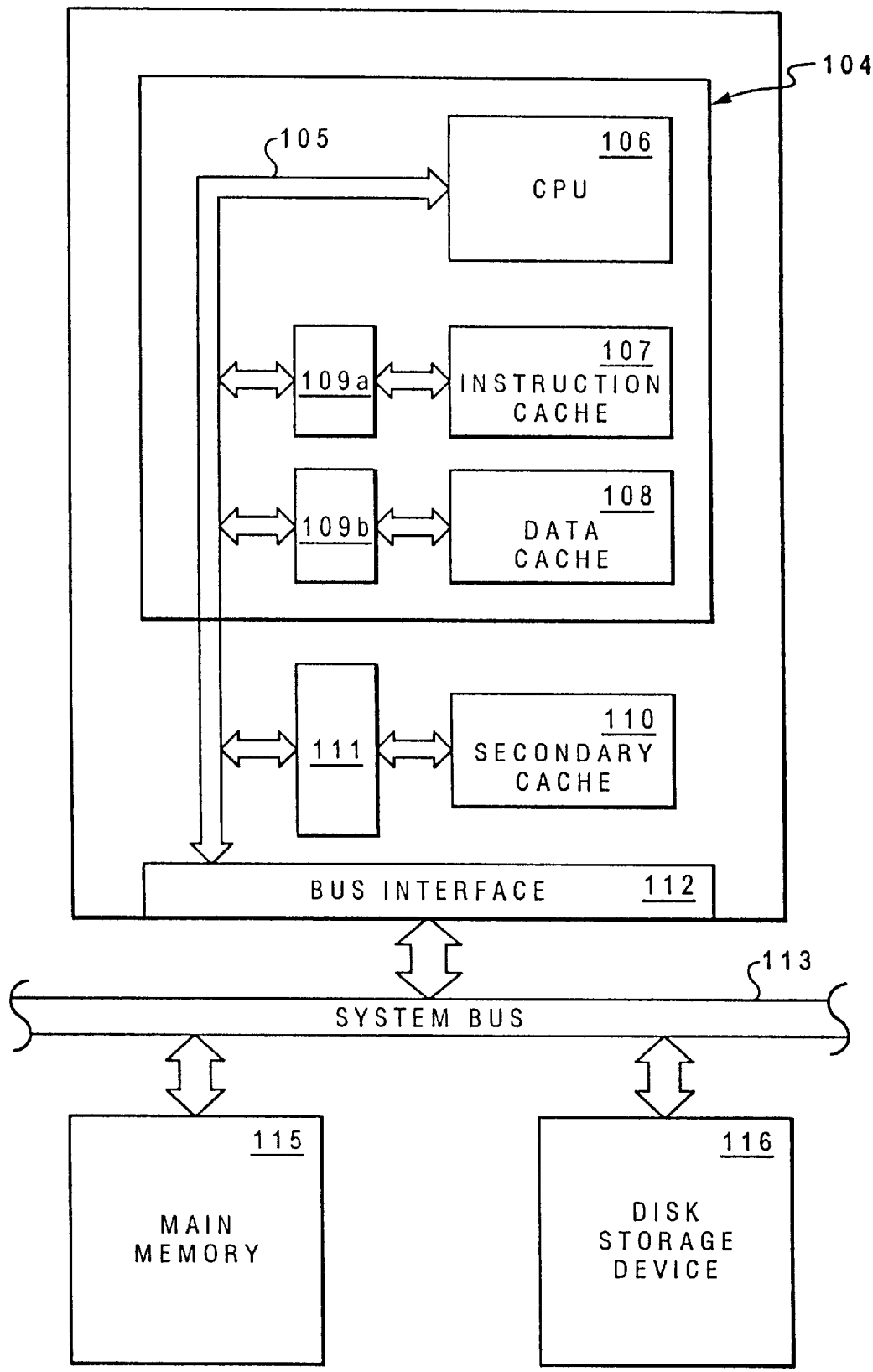
FIG. 2 is a block diagram of a data processing system having a cache memory according to one embodiment of the present invention.

With reference now to the figures, and in particular with reference to FIG. 2, there is illustrated a block diagram of a data processing system in which a cache memory may be incorporated according to one embodiment of the invention. In FIG. 2, only a single processor 104 is shown; however, the features of the present invention are also useful in a multi-processor system. Processor 104, having a CPU 106 which may be of a superscalar RISC type, is constructed as a single-chip device comprising on-chip instruction cache 107 and data cache 108. Both caches 107, 108 are connected to CPU 106 by separate paths within a local bus structure. Instruction cache 107 is connected to local bus 105 via cache controller 109a, while data cache 108 is connected to local bus 105 via cache controller 109b. A secondary cache 110 is also connected to local bus 105 via cache controller 111. Secondary cache 110 is much larger than either instruction cache 107 or data cache 108, and access to secondary cache 110 is also somewhat slower than to either instruction cache 107 or data cache 108. CPU 106 is also connected to system bus 113 via bus interface 112 in which timing and control translations between local bus 105 and system bus 113 are taking place. In addition, a main memory 115 and a disk storage device 116 are coupled to system bus 113 (possibly using one or more intervening buses, such as an I/O bus).

The memory hierarchy is from the fastest to the slowest, from the smallest to the largest, and from the most expensive per bit to the least expensive per bit, in progression from caches 107, 108 to secondary cache 110, to main memory 115, and to disk storage device 116. Main memory 115 contains a subset of what is in disk storage device 116, secondary cache 110 contains a subset of what is in main memory 115, and each of caches 107, 108 contains a subset of what is in secondary cache 110. CPU 106 can access caches 107, 108 within a processor cycle, while it may take several processor cycles to access secondary cache 110. If a cache "miss" occurs in caches 107, 108, and secondary cache 110, then main memory 115 is accessed to perform a cache linefill operation-replacing a cache line with an equivalent bit portion from main memory 115 which contains the addressed data. This cache linefill operation must be performed in order to satisfy the attempted cache access for which a cache "miss" occurred. If main memory 115 does not contain the location for which the cache linefill operation is attempted, then a page containing this data is obtained from disk storage device 116 such that the cache linefill operation can be completed. The time for acquiring a page from disk storage device 116 and writing it to main memory 115 may require many thousands of processor cycles, during which CPU 106 may be switched to do another task or stalled in order to wait for the data to satisfy the request.

In the depicted embodiment, any of the caches may be interleaved, i.e., arranged in subarrays to allow multi-port access. Two (or more) addresses which are presented to the cache in order to access different blocks can thus simultaneously access different subarrays. The interleaved cache(s) can include additional features, such as those disclosed in U.S. patent application Ser. No. 08/638,263, which is hereby incorporated. The caches may be addressed using effective addresses which are preferably generated directly from real addresses or address tags (i.e., a subset of bits forming the full physical address of the corresponding memory block in main memory 115).

Figure 3:
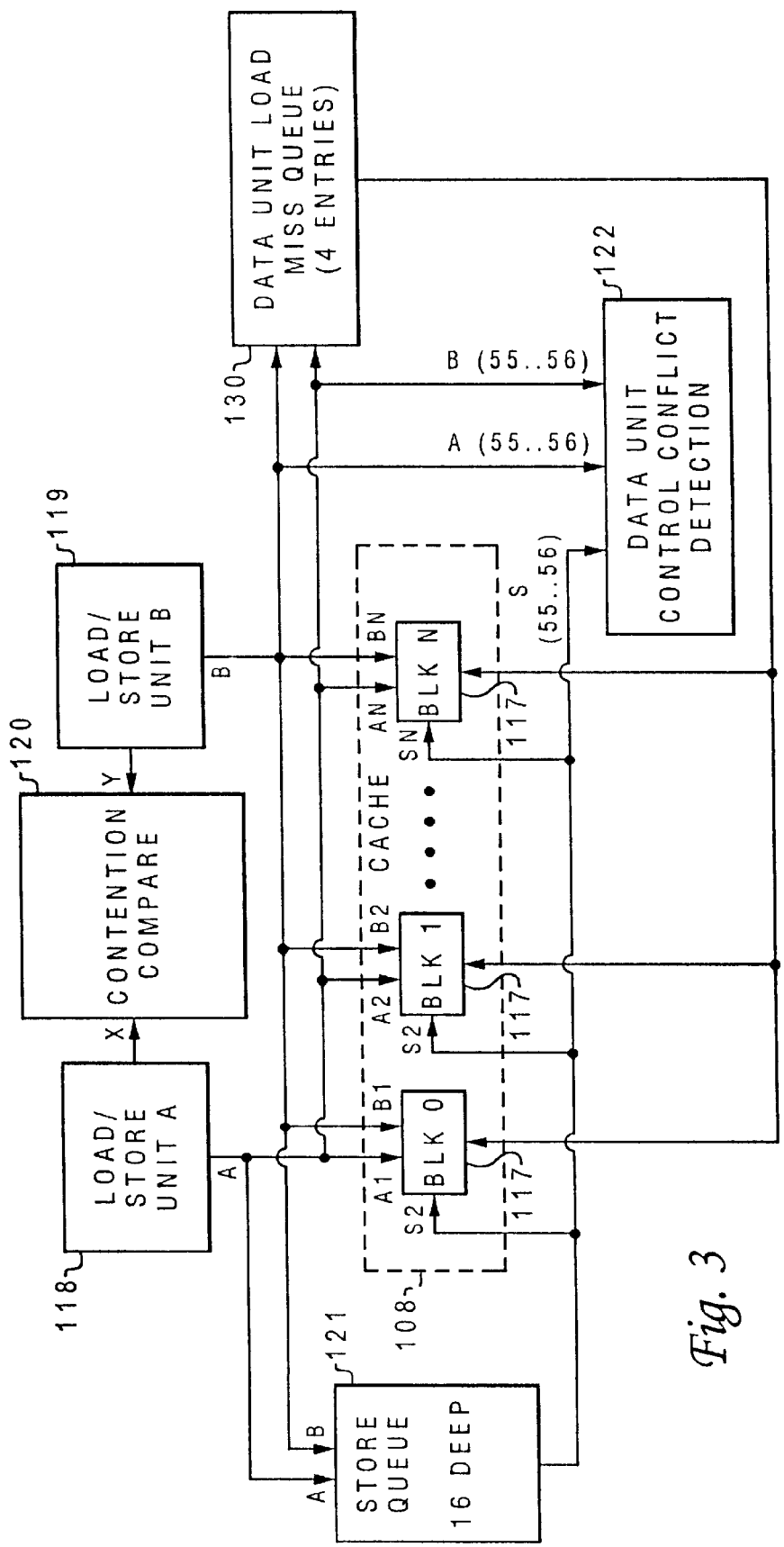
FIG. 3 is a block diagram of a conflict resolution method for a multi-port cache in accordance with the present invention.

In one implementation, shown in FIG. 3, data cache 108 is interleaved by providing four blocks or subarrays 117. Each subarray 117 preferably is substantially identical, and contains 128 cache lines. Each of these 128 cache lines is physically divided into two sections—an odd section and an even section. Each section is 512 bits wide. Thus, the cache entry array portion of a given subarray 117 is 1024 bits wide and 128 bits deep, or a total of 16 kilobytes (8-bit bytes). By defining a double-word which is equal to 64 bits (or 8 bytes), each data cell in a given subarray 117 is 8 double-words wide. In addition to the 1024-bit data field, each cache line has other fields such as a 128-bit parity field, and various control fields including odd and even fields used for a MESI cache coherency protocol.

Cache 108 is accessed using an effective address (EA) including two bits (55,56) which are used to select one of the four cache subarrays. Effective addresses are generated by two load/store units 118 and 119 associated with processor core 106. The subarray selection bits are compared by common contention logic 120 which is used to select one of the two load/store units if a conflict arises between two simultaneous load operations, i.e., if the subarray selection bits from the two load/store units are identical for the load operations. If a conflict occurs, contention logic 120 provides appropriate feedback to one of the units indicating that the unit should stall its operation. The present invention improves conflict detection/resolution performance, by allowing the load/store unit to stall the operation for only one cycle, rather than fully retrying the operation and having to wait at least three cycles while data unit load miss queue 130 retries the instruction.

Store access operations can also be stored in common queue 121. A conflict between either of the load/store units 118 or 119, with queue 121, is detected using a data unit control 122.

Figure 4:
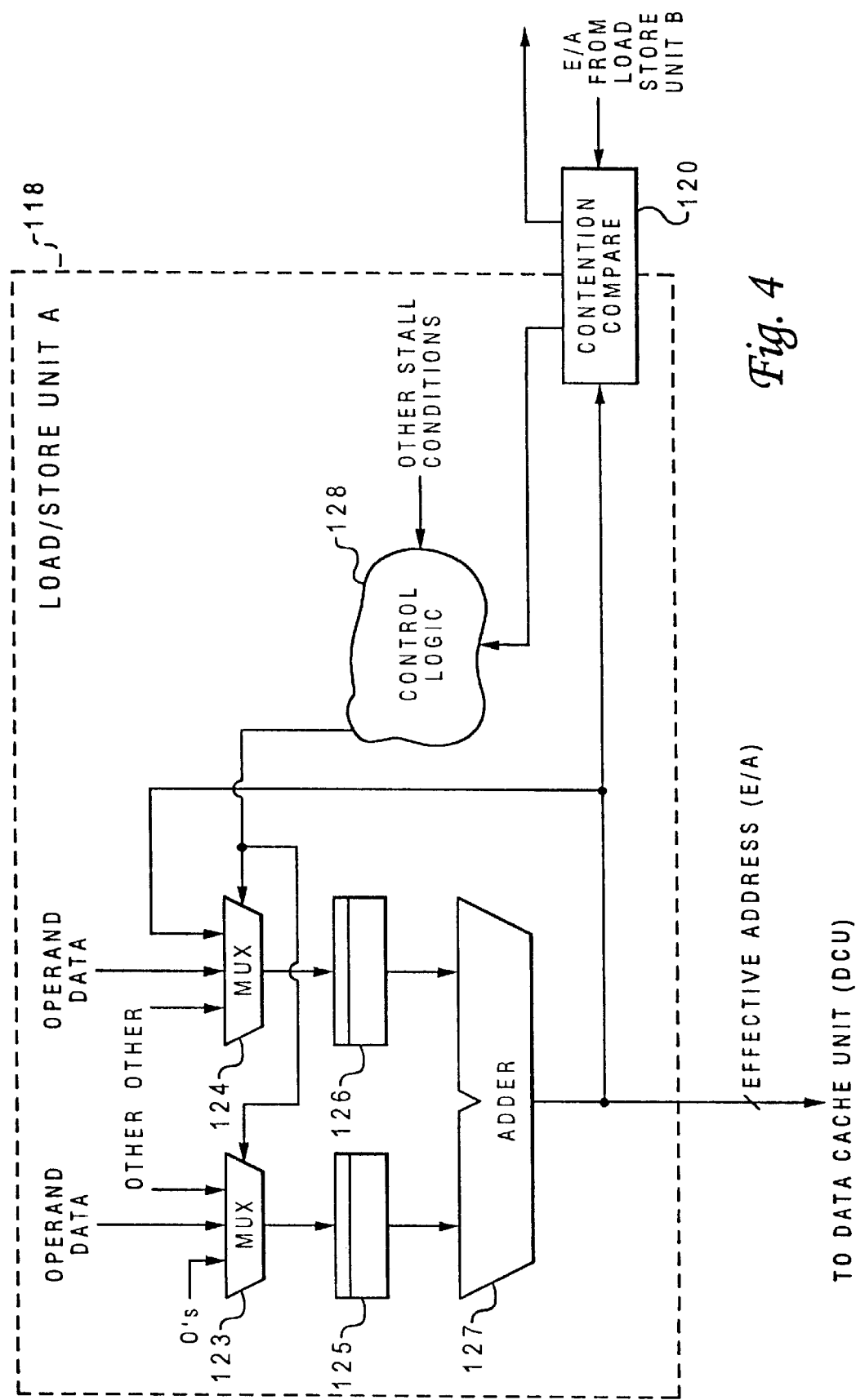
FIG. 4 is a high-level schematic diagram of a load/store unit used with the embodiment of FIG. 3.

FIG. 4 illustrates an exemplary construction for load/store unit 118. Operand data from the CPU are loaded into a first multiplexer 123, and into a second multiplexer 124. The outputs of multiplexers 123 and 124 are connected to respective latches 125 and 126, which provide inputs to an adder 127. Adder 127 generates the effective address, which includes the subarray selection bits. The output of adder 127 is provided as an input to contention logic 120, which compares the subarray selection bits to the current subarray selection bits from load/store unit 119. When contention logic 120 detects a conflict, a stall condition can be generated using control logic 128. Control logic 128 in turn controls multiplexers 123 and 124, to allow selection of a pair of alternate inputs. The alternate input to multiplexer 123 is a string of zeros, while the alternate input to multiplexer 124 is the output of adder 127, i.e., the EA. In this manner, if contention logic 120 detects a conflict, the stalled operation can be re-issued the very next cycle by simply switching the inputs of the multiplexers. The multiplexers may have other inputs to provide additional features unrelated to the present invention.

Other stalling conditions can result in the switching of the multiplexers, via control logic 120, to effectively retain the previous EA. Examples of other stall conditions include a load instruction that crosses a cache line, an operation requiring two fetches, or when the cache cannot accept the EA (e.g., the cache operations queue is full).

The present invention conveniently provides means for determining that the same word (or double word) is being accessed by both load/store units (or all load/store units, in other architectures having more than two such units). This condition is not considered contention since the doubleword being accessed can be forwarded to both units at the same time. Thus, when two load operations arbitrate for the same word or doubleword at the same address, both are allowed to proceed, even though they are in the same subarray. This functionality is managed in contention logic 120. The EA is 64 bits wide, i.e., bits 0:63. The 61 most significant EA bits of load/store unit 118 are compared to the 61 most significant EA bits of load/store unit 119, using a 61 bit comparator. (Bits 0 thru bits 60 are the most significant bits of the address in this machine.) This allows comparison down to the double-word boundary. If the output of this comparator is true, then both load/store units are allowed to proceed. If the output of this comparator is false, then one of the load/store units is stalled similar to the way when bits 55 and 56 did not match. This feature of the invention particularly improves performance when a processing thread steps through a single-precision floating-point array one word at a time, or in an integer array.

While this benefit arises with simultaneous load operations, there would still be a conflict between a load operation and a simultaneous store operation to the same address (or two store operations). These contention conditions can be resolved conventionally, with arbitration logic in data unit control 122. Other conflicts handled by DCU 122 include those between a store operation and a "snoop exclusive" (a request from another microprocessor in a multi-processor environment for the same cache line), or for a store operation on a line which has already been marked for deallocation.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the embodiment depicted in FIGS. 3 and 4 compares the selection bits using common logic, the required bits could instead be:.sent to each load/store unit, and contention would be resolved within the unit. Also, the design of FIG. 3 could be applied to a construction wherein the two load/store units are associated with different processor cores, e.g., in a multi-processor computer wherein caches are grouped together to support two or more of the processors. Finally, the invention could be implemented without using a load/store unit that has stall capability—one of the conflicting instructions can simply be rejected back to the issuing units above the load/store unit, and the EA would be recalculated like a newly issued instruction. It is therefore contemplated that such modifications can be made without departing from the spirit or scope of the present invention as defined in the appended claims.

What is claimed is:

1. A method of resolving address contention between two cache access circuits, comprising the steps of:

generating a first cache address at a first cache access circuit;

generating a second cache address at a second cache access circuit;

comparing the first cache address to the second cache address to detect that said first cache address and said second cache address are not the same; and in response to said comparing step, stalling the first cache access circuit.

2. The method of claim 1 wherein:

the first cache access circuit is a load/store unit associated with a processor core; and said step of generating the first cache address includes the step of adding two operands provided by the processor core to the load/store unit.

3. The method of claim 1 wherein said stalling step includes the step of retaining the first cache address within the first cache access circuit.

4. The method of claim 1 wherein said stalling step stalls the first cache access circuit for one cache access cycle.

5. The method of claim 1 wherein:

the first cache access circuit is a first load/store unit;

the second cache access circuit is a second load/store unit;

the first cache address is associated with a first load operation;

the second cache address is associated with a second load operation.

6. The method of claim 1 wherein:

the first and second cache addresses each have one or more subarray selection bits; and said comparing step compares only the one or more subarray selection bits of the first cache address to the subarray selection bits of the second cache address.

7. The method of claim 2 wherein said stalling step includes the step of retaining the first cache address within the load/store unit.

8. A processing unit for a computer system, comprising:

a processing core having a first cache access circuit generating a first cache address, and having a second cache access circuit generating a second cache address;

a cache connected to said first and second cache access circuits; and means for stalling said first cache access circuit in response to detection of a difference between the first cache address and the second cache address.

9. The processing unit of claim 8 wherein said stalling means includes means for detecting contention based on one or more subarray selection bits in each of said first and second cache addresses.

10. The processing unit of claim 8 wherein said stalling means includes a common contention logic unit for the first and second cache access circuits.

11. The processing unit of claim 8 wherein said first cache access circuit is a load/store unit which generates the first cache address by adding two operands provided by a processor core to said load/store unit.

12. The processing unit of claim 8 wherein said stalling means retains the first cache address within said first cache access circuit.

13. The processing unit of claim 8 wherein:

said first cache access circuit is a first load/store unit;

said second cache access circuit is a second load/store unit;

the first cache address is associated with a first load operation;

the second cache address is associated with a second load operation; and said stalling means determines that the first address and the second address are not the same.

14. The processing unit of claim 8 wherein said cache is interleaved, having at least two cache subarrays and two respective ports.

15. The processing unit of claim 12 wherein said stalling means stalls said first cache access circuit for one cache access cycle.

16. A method of resolving address contention between two cache access circuits, comprising the steps of:

generating a first cache address by adding two operands at a first cache access circuit;

generating a second cache address at a second cache access circuit;

comparing the first cache address to the second cache address to detect address that said first cache address and said second cache address are not the same;

in response to said comparing step, stalling the first cache access circuit for one cache access cycle; and adding said first cache address with a zero value so that said first cache access circuit regenerates said first cache address in a subsequent cycle.

17. A processing unit for a computer system, comprising:

a processing core having a first cache access circuit generating a first cache address by adding two operands, and having a second cache access circuit generating a second cache address;

a cache connected to said first and second cache access circuits;

means for stalling said first cache access circuit in response to detection of a difference between the first cache address and the second cache address; and means for retaining said first cache address for one access cycle by adding said first cache address with a zero value to regenerate said first cache address.

* * * * *